(12) United States Patent
Faragher

(10) Patent No.: US 8,717,435 B2
(45) Date of Patent: May 6, 2014

(54) VIDEO MONITORING DEVICE PROVIDING PARAMETRIC SIGNAL CURVE DISPLAY FEATURES AND RELATED METHODS

(75) Inventor: Chad Faragher, Kitchener (CA)

(73) Assignee: HBC Solutions, Inc., Englewood, CO (US)

( * ) Notice: Subject to any disclaimer, the term of this patent is extended or adjusted under 35 U.S.C. 154(b) by 1538 days.

(21) Appl. No.: 12/100,060

(22) Filed: Apr. 9, 2008

(65) Prior Publication Data

US 2009/0256907 A1     Oct. 15, 2009

(51) Int. Cl.
*H04N 7/18* (2006.01)
*H04N 9/77* (2006.01)

(52) U.S. Cl.
USPC .......................................... 348/143; 348/663

(58) Field of Classification Search
USPC .................................................. 348/143, 663
See application file for complete search history.

(56) References Cited

U.S. PATENT DOCUMENTS

| | | | |
|---|---|---|---|
| 5,399,947 A * | 3/1995 | Washburn ...................... | 315/383 |
| 5,600,573 A | 2/1997 | Hendricks et al. ......... | 364/514 R |
| 5,867,657 A | 2/1999 | Bolosky et al. .......... | 395/200.49 |
| 5,928,327 A | 7/1999 | Wang et al. .................... | 709/217 |
| 6,219,094 B1 * | 4/2001 | Gerlach et al. ................ | 348/184 |
| 6,243,095 B1 | 6/2001 | Shile et al. .................... | 345/357 |
| 6,246,389 B1 | 6/2001 | Timm ........................ | 345/440.1 |
| 6,256,419 B1 * | 7/2001 | Nagasaka et al. ............. | 382/236 |
| 6,393,163 B1 | 5/2002 | Burt et al. ..................... | 382/294 |
| 6,571,349 B1 | 5/2003 | Mann et al. ........................ | 714/6 |
| 6,816,194 B2 | 11/2004 | Zhang et al. ............. | 348/240.27 |
| 7,023,488 B2 | 4/2006 | Szybiak et al. ............... | 348/484 |
| 7,092,621 B1 | 8/2006 | Yoshino et al. .............. | 386/125 |
| 7,333,114 B2 | 2/2008 | Andrews et al. .............. | 345/557 |
| 7,580,067 B2 * | 8/2009 | Kim et al. ..................... | 348/239 |
| 7,636,494 B2 * | 12/2009 | Kudo ............................ | 382/274 |
| 7,834,780 B2 * | 11/2010 | Sullivan et al. ................. | 341/61 |
| 2002/0071029 A1 | 6/2002 | Zell et al. ......................... | 348/97 |
| 2004/0109077 A1 * | 6/2004 | Abdellatif ..................... | 348/335 |
| 2005/0254440 A1 | 11/2005 | Sorrell ........................... | 370/264 |
| 2006/0098022 A1 | 5/2006 | Andrews et al. .............. | 345/557 |
| 2006/0268980 A1 * | 11/2006 | Le Dinh et al. .......... | 375/240.01 |

(Continued)

FOREIGN PATENT DOCUMENTS

| | | | |
|---|---|---|---|
| EP | 0822416 A2 | 2/1998 | ............ G01R 13/34 |
| EP | 0947838 A2 | 10/1999 | ............ G01R 13/34 |
| EP | 0962779 A2 | 12/1999 | ............ G01R 13/02 |
| WO | WO96/37785 | 11/1996 | ............ G01R 13/34 |

OTHER PUBLICATIONS

Evertz-MVP® —Expect the Best, Accept no Substitutes!, available at http://www.evertz.com/products/MVP.

(Continued)

*Primary Examiner* — Douglas Blair
*Assistant Examiner* — Benjamin Ailes
(74) *Attorney, Agent, or Firm* — Tarolli, Sundheim, Covell & Tummino LLP

(57) ABSTRACT

A video monitoring device may include an input for a video input signal, a display, and a video processor coupled to the input and the display. The video processor may be for obtaining from the video input signal at least one parametric signal defining a curve, calculating derivative values for the curve, and displaying pixel intensity values on the display based upon the derivative values so that more rapidly changing portions of the curve appear dimmer and more slowly changing portions of the curve appear brighter.

20 Claims, 5 Drawing Sheets

(56) References Cited

U.S. PATENT DOCUMENTS

| | | | | |
|---|---|---|---|---|
| 2007/0050336 | A1 | 3/2007 | Bugir et al. | 707/3 |
| 2007/0050366 | A1 | 3/2007 | Bugir et al. | 707/9 |
| 2007/0050382 | A1 | 3/2007 | Bugir et al. | 707/100 |
| 2007/0063961 | A1* | 3/2007 | Kuroki | 345/102 |
| 2008/0031539 | A1* | 2/2008 | Daly | 382/274 |
| 2008/0062091 | A1* | 3/2008 | Stewart | 345/76 |
| 2008/0100697 | A1* | 5/2008 | Baker | 348/32 |
| 2010/0090938 | A1* | 4/2010 | Kamada et al. | 345/92 |
| 2010/0177221 | A1* | 7/2010 | Lee | 348/262 |
| 2010/0310189 | A1* | 12/2010 | Wakazono et al. | 382/258 |
| 2011/0134291 | A1* | 6/2011 | Rueckert et al. | 348/280 |

OTHER PUBLICATIONS

Evertz-MVP®, 7767VIP4-HSN & 7767VIP4-SN VIP™ Four Input Video Monitoring and Display, available at http://www-evertz.com/products/7767V1P4.

OmniTek, Advance Measurement Technology, XR Extreme Resolution Waveform Monitor and Image Analyzer for Post-Production, 2007, available at www.omnitek.tv.

OmniTek, Advance Measurement Technology, TQ Complete Video and Audio Monitoring for Broadcast and Transmission Quality Control, 2007, available at www.omnitek.tv.

Avitech International Corporation, MCC-8004 Media Command Center, 2008, available at www.avitechvideo.com/media_Command8000.asp.

Avitech International Corporation, VCC-8000 Media Command Center, 2008, available at www.avitechvideo.ccm/media_Command8000.asp.

Evertz-MVP®—Expect the Best, Accept no Substitutes!, available at http://www.evertz.com/products/MVP, download date Mar. 21, 2008.

Evertz-MVP®, 7767VIP4-HSN & 7767VIP4-SN VIP™ Four Input Video Monitoring and Display, available at http://www.evertz.com/products/7767VIP4, download date Mar. 21, 2008.

* cited by examiner

VIDEO MONITORING DEVICE PROVIDING PARAMETRIC SIGNAL CURVE DISPLAY FEATURES AND RELATED METHODS

FIELD OF THE INVENTION

The present invention relates to the field of video signal processing, and, more particularly, to video signal test and measurement systems and related methods.

BACKGROUND OF THE INVENTION

Various types of devices have traditionally been used in video applications for signal testing and monitoring purposes. One such device is the waveform monitor, which is a specialized form of oscilloscope used to measure and display the level or voltage of a video signal (i.e., luminance) with respect to time. This level may be used for calibrating a video camera, for example, as well as other uses. Another important device is the vectorscope, which is another specialized form of oscilloscope that is used to visualize chrominance components of a video signal.

As television and other video formats transition to the digital domain, the need for digital (i.e., computer-based) testing and monitoring tools has increased. Yet, typical video monitoring tools often fall short of the level of information that can be provided with analog devices such as waveform monitors and vectorscopes. As a result, certain approaches have been developed in an attempt to replicate video signal analysis capabilities of analog devices in digital video platforms.

By way of example, one such digital video signal testing and monitoring platform is the Omnitek XR from Image Processing Techniques Ltd. of the UK. Waveform generation algorithms are used to give user-adjustable displays. Arbitrary combinations of components may be displayed simultaneously, such as YRGB and vectorscope, or YCbCr and Composite. The continuously variable H and V magnification and Y range may be set via a region-of-interest control. The vectorscope is scalable, and may also operate on a selected region-of-interest. Further, a "luma qualification mode" enables the vectorscope to display chroma values within a specific luma range.

While such devices have begun to provide waveform monitor and vectorscope views, further enhancements to the capabilities of such digital waveform monitor and vectroscope simulators may be desirable to more closely approximate the actual output of their analog counterparts in some applications.

SUMMARY OF THE INVENTION

In view of the foregoing background, it is therefore an object of the present invention to provide video monitoring devices with enhanced testing and monitoring features and related methods.

This and other objects, features, and advantages are provided by a video monitoring device which may include an input for a video input signal, a display, and a video processor coupled to the input and the display. The video processor may be for obtaining from the video input signal at least one parametric signal defining a curve, calculating derivative values for the curve, and displaying pixel intensity values on the display based upon the derivative values so that more rapidly changing portions of the curve appear dimmer and more slowly changing portions of the curve appear brighter. As such, the video monitoring device may advantageously provide a digital or computer-based monitoring platform that more accurately approximates the outputs of traditional analog waveform monitors and/or vectorscopes, for example.

More particularly, the video processor may further perform an accumulation so that each displayed pixel intensity value is based upon a current pixel intensity value and at least one prior pixel intensity value. By way of example, the video processor may include a frame buffer for performing the accumulation. In addition, the video processor may further perform an intensity modulation so that each displayed pixel intensity value is based upon a modulated derivative value.

The video processor may further display the video signal on the display. Additionally, the video processor may perform the calculating and displaying in real-time with respect to the at least one parametric signal. The video processor may include a Graphics Processing Unit (GPU), for example. Also by way of example, the at least one parametric signal may include one or more luma and/or chroma components.

A related video processing method may include obtaining at least one parametric signal defining a curve from a video input signal, and calculating derivative values for the curve. The method may further include displaying pixel intensity values on a display based upon the derivative values so that more rapidly changing portions of the curve appear dimmer and more slowly changing portions of the curve appear brighter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements or steps in alternate embodiments.

Generally speaking, components of a video signal, such a luma and chroma components, define parametric curves in which the line is parametric over some non-spatial quantity, such as time, and may cross over itself (or coincide with itself) at any number of places. Thus, when these curves are rendered in line graph form on a waveform monitor or vectorscope, for example, locations where the line crosses over itself will appear brighter (because this section is being illuminated more often by the electron beam). Additionally, in those locations where the curve changes more rapidly, the phosphors will appear dimmer (because the beam remains on the phosphor a shorter amount of time), and vice-versa.

Figure 5:
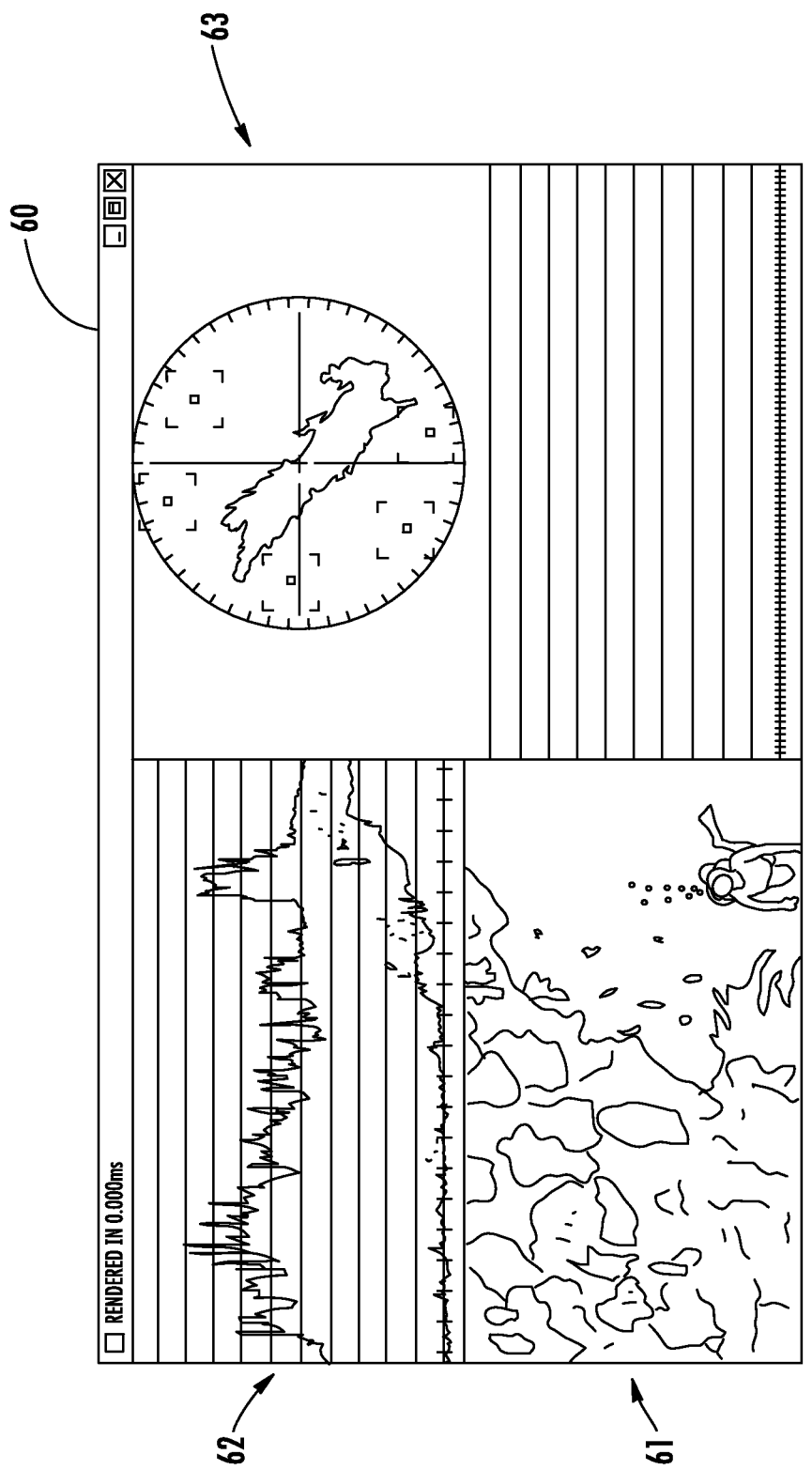
FIG. 5 is a display view showing, in respective quadrants of the display, a video input signal and corresponding waveform monitor and vectorscope views generated in accordance with a prior art technique.

While these subtleties are readily apparent to the skilled artisan on traditional analog waveform monitors and vectorscopes, they typically do not translate to computer or digitally-based waveform simulation tools. Referring initially to FIG. 5, consider a CRT-based video waveform monitor which is a function plot of video input signal 61 image data (of an undersea diver next to a coral reef), where the data samples have an x,y location on a screen 60. In the illustrated example, the video input signal 61 data samples are mapped to the lower left quadrant of the screen 60, although they could be mapped to other locations or windows on the screen 60 as well.

A plot of x horizontally vs. luminance (Y) vertically may be expressed as a linear combination of red (r), green (g), and blue (b). A digitally-generated plot 62 (i.e., a simulated waveform monitor view) of this luminance function using a simple prior art line graph technique shows lines of full intensity, as seen in the upper left quadrant of the screen 60. The plot 62 does not capture the information of the time at any point on the curve as would a waveform monitor output, since any point at which the curve crosses the pixel value will be fully saturated. A vectorscope view 63 of the red and blue chroma components Cr, Cb of the input video signal 61 that is generated using the same technique is shown in the upper right quadrant. Again, since every point at which the functions cross is fully saturated, the varying intensity level that would otherwise have been present on an analog vectorscope is lost. The lower right quadrant of the screen 60 is not used in the illustrated example.

Figure 1:
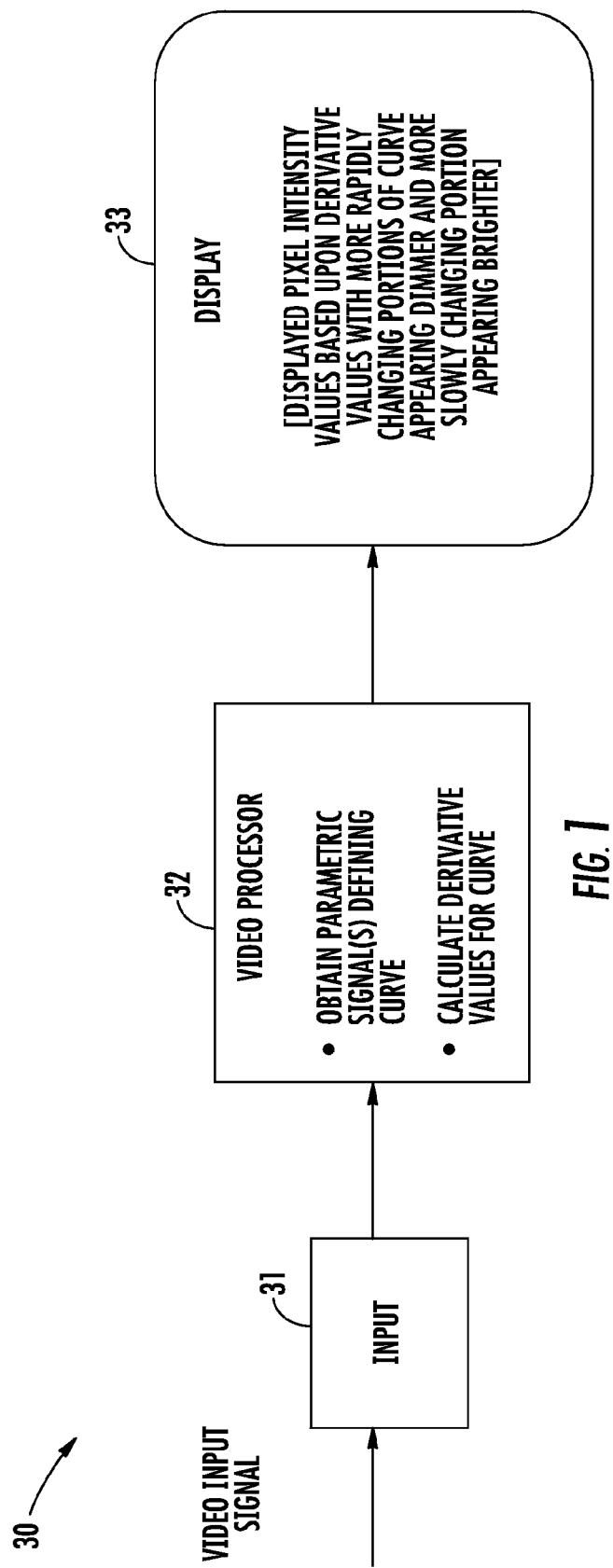
FIG. 1 is a schematic block diagram of an exemplary video monitoring device in accordance with the invention.
Figure 3:
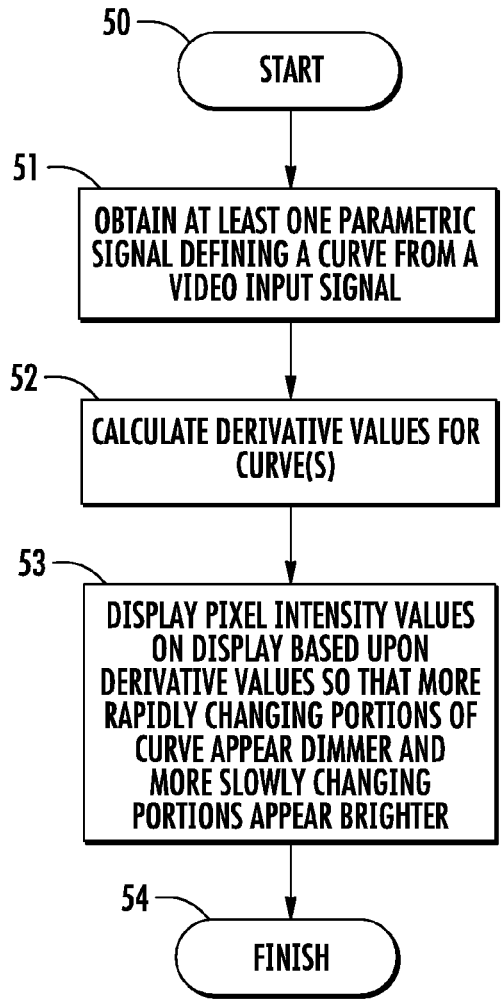
FIGS. 3 and 4 are flow diagrams illustrating video monitoring method aspects of the invention.

Turning to FIGS. 1 and 3, a video monitoring device 30 and associated method in accordance with the invention are now described. The video monitoring device 30 illustratively includes an input 31 for a video input signal, a display 33, and a video processor 32 coupled to the input and the display. Generally speaking, the video processor 32 obtains from the video input signal one or more parametric signals (e.g., luma and/or chroma components) defining a curve, at Blocks 50-51. The video processor 32 also illustratively calculates derivative values for the curve, at Block 52, and displays pixel intensity values on the display 33 based upon the derivative values so that more rapidly changing portions of the curve appear dimmer, and more slowly changing portions of the curve appear brighter, at Block 53, thus concluding the illustrated method (Block 54). As such, the video monitoring device advantageously provides a digital or computer-based monitoring platform that more accurately approximates the outputs of traditional analog waveform monitors and/or vectorscopes, for example, as will be discussed further below.

Figure 2:
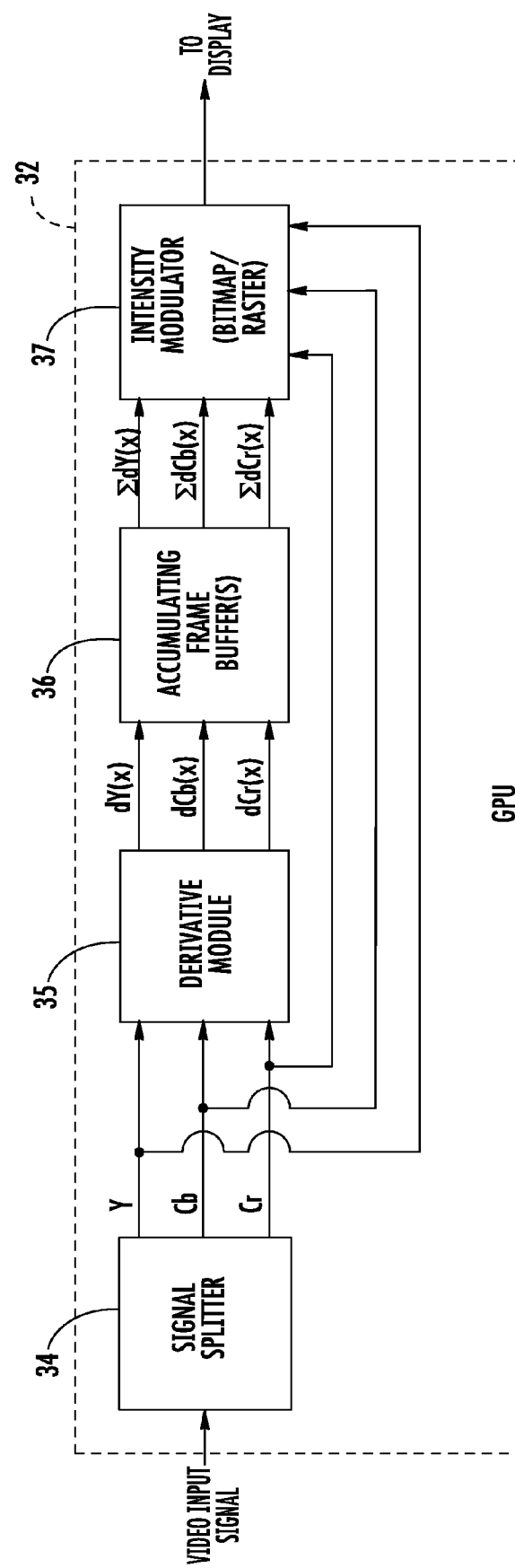
FIG. 2 is a schematic block diagram of an exemplary embodiment of the video processor of the video monitoring device of FIG. 1.

Referring more particularly to FIG. 2, in one exemplary embodiment the video processor 32 may be implemented with a graphics processing unit (GPU). However, the various components and functions of the GPU 32 described herein need not be performed by a dedicated GPU in all embodiments, and could instead be performed by a system microprocessor, etc., as will be appreciated by those skilled in the art. In the illustrated example, the input video signal is a composite signal, and a signal splitter 34 is used to separate the composite signal into its respective luma (Y) and red/blue chroma (Cr, Cb) components, as will be appreciated by those skilled in the art. However, in some embodiments the signal provided from the input 31 may already be separated into its respective components, so that the signal splitter 34 need not be included. Moreover, in some embodiments the input 31 and video processor 32 could be integrated in the same GPU, and other parametric video signal types (e.g., RGB, etc.) may be used instead of YCrCb.

The GPU 32 also illustratively includes a derivative module 35 downstream from the signal splitter 34 for generating derivates $dY(x)$, $dCb(x)$, and $dcr(x)$ of the respective Y, Cb, and Cr components. It should be noted that in some embodiments the derivative module 35 (or other component) may first convert the Y, Cb, and Cr components to color spare (i.e., RGB) prior to performing the derivative and subsequent operations discussed below, as will be appreciated by those skilled in the art. As noted above, in a parametric function plot of position vs. time on a classical waveform monitor scope (i.e., with an electron beam illuminating phosphor), the rate of change of position of the beam is related to how much time the electron beam illuminates the phosphor, and in turn how intense the glow of the phosphor is. Where the curve changes value slowly over time, the glow is more intense, and where the curve changes value quickly, the glow is less intense. Taking the first derivative of the parametric curve of the components Y, Cb, and Cr with respect to time and using it to modulate the intensity of pixels being drawn provides a relatively accurate simulation of this change in intensity as it would appear on the phosphor.

The derivative of a given curve can be pre-calculated, or it may be calculated using a GPU feature that remembers the partial derivatives of X and Y in screen space with respect to the plot of the line (which corresponds to time), as will be appreciated by those skilled in the art. By way of example, using the DirectX platform from Microsoft Corp., the partial derivatives may be calculated using the HLSL expression "fwidth(input.coord.xy)," although other platforms and approaches may also be used.

Figure 4:
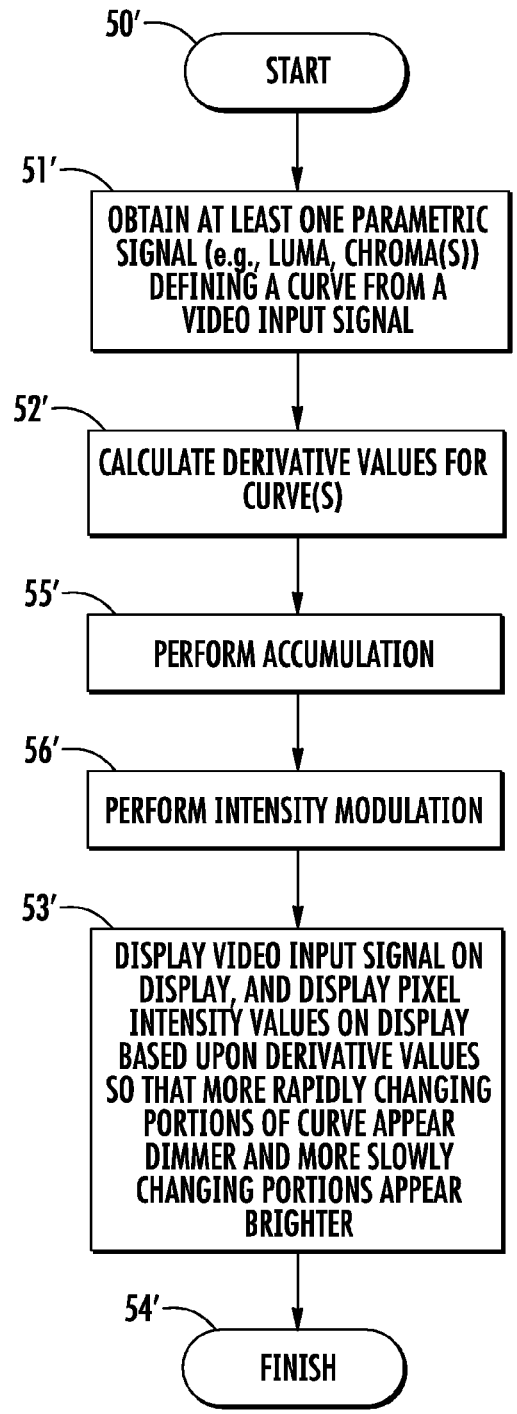

Additionally, the GPU 32 also performs an accumulation or saturation of the derivative values $dY(x)$, $dCb(x)$, and $dCr(x)$ (or their equivalent RGB values) of respective signal components so that each displayed pixel intensity value is based upon a current pixel intensity value and at least one prior pixel intensity value, at Block 55' (FIG. 4). By way of example, the GPU 32 illustratively includes one or more accumulating frame buffers 36 for performing the accumulation, providing accumulated component outputs $\Sigma dY(x)$, $\Sigma dCb(x)$, and $\Sigma dCr(x)$. In other words, as each pixel is drawn, new frame buffer 36 values are assigned a linear combination of the previous frame buffer value and the new pixel value, as will be appreciated by those skilled in the art. In accordance with one exemplary embodiment, a value of saturation used may be the inverse of the first derivative, although other values may also be used.

The video processor 32 may further perform an intensity modulation so that each displayed pixel intensity value is based upon a modulated derivative value, at Block 56'. That is, the intensity of pixels to be displayed is modulated (multiplied) by the accumulated derivative quantity so that it is therefore scaled to the appropriate intensity on the display 33. The intensity modulator 37 provides the appropriate bitmap/raster output for the display 33, which may be a liquid crystal display (LCD), cathode ray tube (CRT) monitor, or other suitable monitor type, as will be appreciated by those skilled in the art.

The GPU may also advantageously display the original video signal along with the derivative curve values. This is illustratively shown by the Y, Cr, and Cb components being directly fed from the signal splitter 34 to the intensity modulator 37 to be included in the bitmap/raster output for the display 33. Because of the dedicated graphics processing ability of the GPU 32, the derivative calculation, accumulation, and displaying of the curve values may advantageously be performed in real-time with respect to the parametric signals Y, Cb, and Cr so that they may be displayed simulataneously on the display 33 for comparison.

Figure 6:
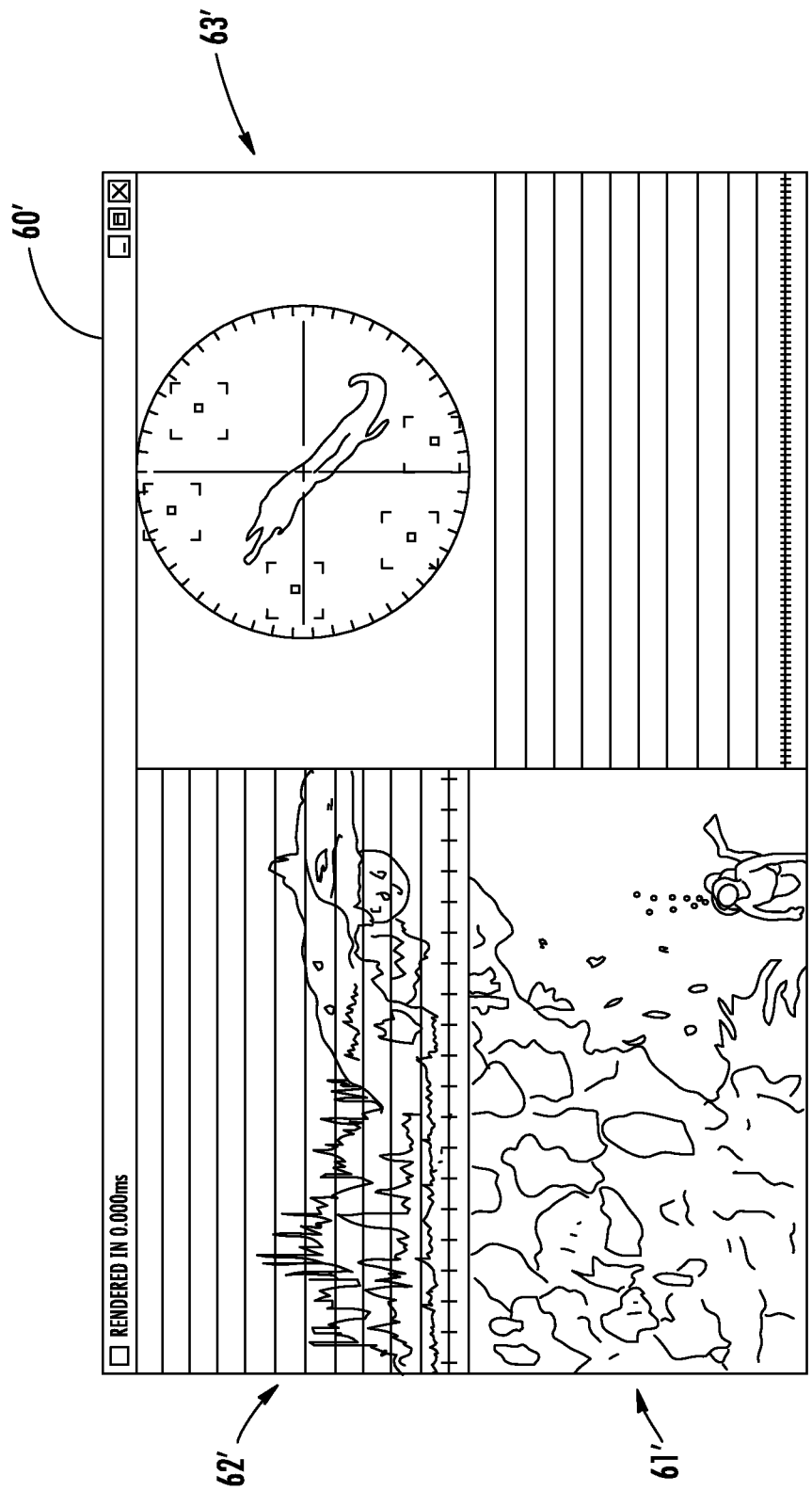
FIG. 6 is a display view corresponding to that of FIG. 5 with the same video input signal, but with the waveform monitor and vectorscope views generated in accordance with the present invention.

Turning now to FIG. 6, the same video signal 61' discussed above with reference to FIG. 5 is again shown in the lower left quadrant of the screen 60', but here the simulated Y waveform view 62' and vectorscope view 63' are generated using the above-described derivation and accumulation approach. The viewer is now able to visualize the time component of the plots (i.e., since they are derivative-based), which was previously not represented in plots 62 and 63. In addition, the extraneous contributions of fast moving parts of the curve (vertically oriented line segments in the case of the waveform monitor) are visually reduced because they are extremely faint. In some embodiments, the degree to which the derivative modulates the intensity may be adjusted by the user at runtime, if desired.

The video processing device 30 therefore advantageously provides a computer or digitally-based broadcast, post-production, research and development, and/or manufacturing production platform which may provide side-by-side comparisons of an input video with its component waveform and vectorscope outputs, for example. Moreover, the simulated waveform and vectorscope plots more closely approximate the outputs of their analog counterparts, providing enhanced information to video engineers and technicians in a convenient multi-window display.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video monitoring device for plotting video signal data and comprising:
    an input configured to receive a video input signal;
    a display; and
    a video processor coupled to said input and said display;
    the video processor:
        obtaining from the video input signal at least one parametric signal defining a curve,
        calculating derivative values for the curve, and
        displaying a plot of the curve on said display based upon the derivative values so that more rapidly changing portions of the curve have lower pixel intensity values in the plot and more slowly changing portions of the curve have a higher pixel intensity in the plot.

2. The video monitoring device of claim 1 wherein said video processor performing an accumulation so that each displayed pixel intensity value is based upon a current pixel intensity value and at least one prior pixel intensity value.

3. The video monitoring device of claim 2 wherein said video processor comprises a frame buffer performing the accumulation.

4. The video monitoring device of claim 1 wherein said video processor performing an intensity modulation so that each displayed pixel intensity value is based upon a modulated derivative value.

5. The video monitoring device of claim 1 wherein said video processor displaying on said display the video input signal.

6. The video monitoring device of claim 1 wherein said video processor performing the calculating and displaying in real-time with respect to the at least one parametric signal.

7. The video monitoring device of claim 1 wherein said video processor comprises a Graphics Processing Unit (GPU).

8. The video monitoring device of claim 1 wherein the at least one parametric signal comprises a luma component.

9. The video monitoring device of claim 1 wherein the at least one parametric signal comprises at least one chroma component.

10. A video monitoring device for plotting video signal data and comprising:
    an input configured to receive a video input signal;
    a display; and
    a video processor coupled to said input and said display;
    the video processor:
        obtaining from the video input signal at least one parametric signal defining a curve, calculate derivative values for the curve,
        performing an accumulation of derivative values corresponding to respective pixels so that an intensity value for each pixel is based upon a current pixel intensity value and at least one prior pixel intensity value,
        displaying a plot of the curve on said display so that more rapidly changing portions of the curve have lower pixel intensity values in the plot and more slowly changing portions of the curve have a higher pixel intensity in the plot, and
        displaying the video input signal on said display.

11. The video monitoring device of claim 10 wherein said video processor performing an intensity modulation so that each displayed pixel intensity value is based upon a modulated derivative value.

12. The video monitoring device of claim 11 wherein said video processor comprises a frame buffer performing the accumulation.

13. The video monitoring device of claim 10 wherein said video processor comprises a Graphics Processing Unit (GPU).

14. The video monitoring device of claim 10 wherein the at least one parametric signal comprises at least one of a luma component and a chroma component.

15. A video processing method for plotting video signal data comprising:
    obtaining at least one parametric signal defining a curve from a video input signal;
    calculating derivative values for the curve; and
    displaying a plot of the curve on a display based upon the derivative values so that more rapidly changing portions of the curve have lower pixel intensity values in the plot and more slowly changing portions of the curve have a higher pixel intensity in the plot.

16. The method of claim 15 further comprising performing an accumulation so that each displayed pixel intensity value is based upon a current pixel intensity value and at least one prior pixel intensity value.

17. The method of claim 15 further comprising performing an intensity modulation so that each displayed pixel intensity value is based upon a modulated derivative value.

18. The method of claim 15 further comprising displaying the video input signal on the display.

19. The method of claim 15 wherein calculating and displaying are performed in real-time with respect to the at least one parametric signal.

20. The method of claim 15 wherein the at least one parametric signal comprises at least one of a luma component and a chroma component.

\* \* \* \* \*